United States Patent
Mondal et al.

(10) Patent No.: US 11,874,951 B2
(45) Date of Patent: Jan. 16, 2024

(54) SYSTEM AND METHOD FOR RISK AWARE DATA ANONYMIZATION

(71) Applicant: Tata Consultancy Services Limited, Mumbai (IN)

(72) Inventors: Sutapa Mondal, Pune (IN); Saket Saurabh, Pune (IN); Arun Ramamurthy, Pune (IN); Mangesh Sharad Gharote, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 330 days.

(21) Appl. No.: 17/401,559

(22) Filed: Aug. 13, 2021

(65) Prior Publication Data

US 2022/0300651 A1    Sep. 22, 2022

(30) Foreign Application Priority Data

Mar. 16, 2021  (IN) .............................. 202121011145

(51) Int. Cl.
  *G06F 21/62* (2013.01)
  *G06F 18/23* (2023.01)
  *G06N 5/01* (2023.01)

(52) U.S. Cl.
  CPC .......... *G06F 21/6254* (2013.01); *G06F 18/23* (2023.01); *G06N 5/01* (2023.01)

(58) Field of Classification Search
  None
  See application file for complete search history.

(56) References Cited

U.S. PATENT DOCUMENTS

| | | | |
|---|---|---|---|
| 10,628,608 B2 | 4/2020 | Hebert et al. | |
| 2017/0149793 A1* | 5/2017 | Spertus | G06F 21/6245 |
| 2019/0042791 A1* | 2/2019 | Dinov | G06F 17/18 |
| 2019/0130130 A1 | 5/2019 | Huang | |
| 2019/0266354 A1* | 8/2019 | Banerjee | G06F 16/93 |

OTHER PUBLICATIONS

Byun et al., "Efficient k-Anonymization Using Clustering Techniques," (2007).
Folkesson, "Anonymization of directory-structured sensitive data," (2019).
Silva et al., "A Re-identification Risk-based Anonymization Framework for Data Analytics Platforms," (2018).
Zheng et al., "K-Anonymity Algorithm based on Improved Clustering," (2018).

* cited by examiner

*Primary Examiner* — William J. Goodchild
(74) *Attorney, Agent, or Firm* — FINNEGAN, HENDERSON, FARABOW, GARRETT & DUNNER LLP

(57) ABSTRACT

This disclosure relates generally to data anonymization and more particular y risk-aware data anonymization. Conventional data anonymization systems either replace PII/sensitive attributes with random values or shuffles them, that causes huge data distortion affecting the data utility. The goal of publishing data is best achieved when privacy is balanced with utility of data, Moreover, to ensure privacy, assessing the risk of disclosure is important. The proposed system provides a pipeline for analysis of data patterns to understand the associated risk level of re-identification of records. Further, based on the identified risks with the records the system anonymizes the data following a pattern based anonymization approach wherein data is clustered and for each cluster distinct patterns are identified such that the information loss is minimal.

17 Claims, 14 Drawing Sheets

SYSTEM AND METHOD FOR RISK AWARE DATA ANONYMIZATION

PRIORITY CLAIM

This U.S. patent application claims priority under 35 U.S.C. § 119 to: India Application No. 202121011145, filed on Mar. 16, 2021. The entire contents of the aforementioned application are incorporated herein by reference.

TECHNICAL FIELD

The disclosure herein generally relates to data anonymization, and, more particularly, to system and method for risk-aware data anonymization.

BACKGROUND

Maintaining privacy while publishing data is one of the major concerns for organizations which deals with databases comprising sensitive information of employees, vendors, production and customers. The organizations may need to publish data for various business process, thus publishing data in a privacy aware manner is a necessity so that leakage of sensitive information of an individual does not happen.

The existing methods try to address this concern by randomly shuffling the data or generalizing or suppressing the data attributes based on domain hierarchies as input from the users or involving strategies like k-anonymity. The existing procedures although are able to achieve the goal of anonymizing data to an extend but the techniques still involve fair amount of human intervention to complete the process. Moreover, the existing anonymization techniques lead to huge amount of information loss because they do not focus on the records which are majorly at risk of disclosure rather generalize all records to a higher level. The methods do not cater to the concerns of performing the computational tasks to be carried out post anonymization which essentially requires the anonymized data to be meaningful enough to perform analysis.

SUMMARY

Embodiments of the present disclosure present technological improvements as solutions to one or more of the above-mentioned technical problems recognized by the inventors in conventional systems. For example, in one embodiment, a method for risk aware data anonymization is provided.

The method includes obtaining a dataset comprising a plurality of records for anonymization, the plurality of records comprising a plurality of attributes, via one or more hardware processors. Further, the method includes identifying a first set of properties and a second set of properties of the plurality of records, via the one or more hardware processors, wherein the first set of properties is associated with metadata of the plurality of records, and the second set of properties defines generalization of the attributes of the plurality of records. Furthermore, the method includes identifying, via the one or more hardware processors, one or more sensitive attributes, personal identifiable information (PII) and quasi-identifiers set associated with the plurality of attributes. Moreover, the method includes identifying, using one or more association rule mining techniques, a plurality of patterns in a subset of the dataset associated with the quasi-identifier set, via the one or more hardware processors, each of the plurality of patterns comprises a combination of attribute values associated with the plurality of attributes, the plurality of patterns identified based on a frequency of pattern occurrence in the plurality of records. Also, the method includes computing, via the one or more hardware processors, a record score associated with each record of the plurality of records based on a pattern associated with the record, wherein the record score associated with the record is indicative of risk-level associated with the record, and wherein the record score associated with the record is determined based on a support metric and a confidence metric associated with the record. Also, the method includes performing, based on the record score and an attribute proportion value associated with the plurality of attributes of the record, via the one or more hardware processors, a first level of risk assessment for the plurality of records to identify a set of risky records from amongst the plurality of records, the attribute proportion value associated with an attribute is indicative of proportion of the attribute in plurality of records. Also, the method includes classifying, via the one or more hardware processors, the set of risky records into a set of levels indicative of a severity of risk based on the one or more sensitive attributes associated with each of the set of risky records. Further, the method includes systematically applying a pattern-based K-Anonymization (PBKA) to the set of risky records and a set of remaining records from amongst the plurality of records using a greedy model, via the one or more hardware processors. Applying the PBKA includes clustering the set of risky records and the set of remaining records to obtain a plurality of clusters, and for each duster of the plurality of clusters, forming a plurality of m-sets by mapping at least k records from amongst the plurality of records to a pattern from amongst the plurality of patterns based on the generalized information loss incurred. Also, the method includes computing, via the one or more hardware processors, a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set. Further, method includes computing, via the one or more hardware processors, a post-risk score indicative of a second level of risk assessment, wherein the post-risk score is computed as a total percentage of m-sets having a diversity metric greater than a threshold and the set of risky records being part of the diverse sets. Performing the second level of risk assessment comprises determining, from amongst the plurality of m-sets, a set of m-sets having the diversity metric greater than a predefined threshold value to obtain a plurality of diverse sets, and determining whether the set of risky records belong to the plurality of diverse sets and a total predefined percentage of the sets are diverse.

In another aspect, a system for risk aware data anonymization is provided. The system includes a memory storing instructions; one or more communication interfaces; and one or more hardware processors coupled to the memory via the one or more communication interfaces. The one or more hardware processors are configured by the instructions to obtain a dataset comprising a plurality of records for anonymization, the plurality of records comprising a plurality of attributes. The one or more hardware processors are configured by the instructions to identify a first set of properties and a second set of properties of the plurality of records, wherein the first set of properties is associated with metadata of the plurality of records, and the second set of properties defines generalization of the attributes of the plurality of records. Further, the one or more hardware processors are configured by the instructions to identify one or more sensitive attributes, personal identifiable information (PII) and quasi-identifiers set associated with the plurality of attributes. Furthermore the one or more hardware processors are configured by the instructions to identify, using one or more association rule mining techniques, a plurality of patterns in a subset of the dataset associated with the quasi-identifier set, each of the plurality of patterns comprises a combination of attribute values associated with the plurality of attributes, the plurality of patterns identified based on a frequency of pattern occurrence in the plurality of records. Also, the one or more hardware processors are configured by the instructions to compute a record score associated with each record of the plurality of records based on a pattern associated with the record, wherein the record score associated with the record is indicative of risk-level associated with the record, and wherein the record score associated with the record is determined based on a support metric and a confidence metric associated with the record. Moreover, the one or more hardware processors are configured by the instructions to perform, based on the record score and an attribute proportion value associated with the plurality of attributes of the record, a first level of risk assessment for the plurality of records to identify a set of risky records from amongst the plurality of records, the attribute proportion value associated with an attribute is indicative of proportion of the attribute in plurality of records. Also, the one or more hardware processors are configured by the instructions to classify the set of risky records into a set of levels indicative of a severity of risk based on the one or more sensitive attributes associated with each of the set of risky records. Further, the one or more hardware processors are configured by the instructions to systematically apply a pattern-based K-Anonymization (PBKA) to the set of risky records and a set of remaining records from amongst the plurality of records using a greedy model, wherein to apply the PBKA, the one or more hardware processors are configured by the instructions to cluster the set of risky records and the set of remaining records to obtain a plurality of clusters, and for each cluster of the plurality of clusters, form a plurality of m-sets by mapping at least k records from amongst the plurality of records to a pattern from amongst the plurality of patterns based on the generalized information loss incurred. Furthermore, the one or more hardware processors are configured by the instructions to compute a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set. Further, the one or more hardware processors are configured by the instructions to compute a post-risk score indicative of a second level of risk assessment, wherein the post-risk score is computed as a total percentage of m-sets having a diversity metric greater than a threshold and the set of risky records being part of the diverse sets, wherein to perform the second level of risk assessment, the one or more hardware processors are configured by the instruction to determine, from amongst the plurality of m-sets, a set of m-sets having the diversity metric greater than a predefined threshold value to obtain a plurality of diverse sets; and determine whether the set of risky records belong to the plurality of diverse sets and a total predefined percentage of the sets are diverse.

In yet another aspect, a non-transitory computer readable medium for method for risk aware data anonymization includes obtaining a dataset comprising a plurality of records for anonymization, the plurality of records comprising a plurality of attributes, via one or more hardware processors. Further, the method includes identifying a first set of properties and a second set of properties of the plurality of records, via the one or more hardware processors, wherein the first set of properties is associated with metadata of the plurality of records, and the second set of properties defines generalization of the attributes of the plurality of records. Furthermore, the method includes identifying, via the one or more hardware processors, one or more sensitive attributes, personal identifiable information (PII) and quasi-identifiers set associated with the plurality of attributes. Moreover, the method includes identifying, using one or more association rule mining techniques, a plurality of patterns in a subset of the dataset associated with the quasi-identifier set, via the one or more hardware processors, each of the plurality of patterns comprises a combination of attribute values associated with the plurality of attributes, the plurality of patterns identified based on a frequency of pattern occurrence in the plurality of records. Also, the method includes computing, via the one or more hardware processors, a record score associated with each record of the plurality of records based on a pattern associated with the record, wherein the record score associated with the record is indicative of risk-level associated with the record, and wherein the record score associated with the record is determined based on a support metric and a confidence metric associated with the record. Also, the method includes performing, based on the record score and an attribute proportion value associated with the plurality of attributes of the record, via the one or more hardware processors, a first level of risk assessment for the plurality of records to identify a set of risky records from amongst the plurality of records, the attribute proportion value associated with an attribute is indicative of proportion of the attribute in plurality of records. Also, the method includes classifying, via the one or more hardware processors, the set of risky records into a set of levels indicative of a severity of risk based on the one or more sensitive attributes associated with each of the set of risky records. Further, the method includes systematically applying a pattern-based K-Anonymization (PBKA) to the set of risky records and a set of remaining records from amongst the plurality of records using a greedy model, via the one or more hardware processors. Applying the PBKA includes clustering the set of risky records and the set of remaining records to obtain a plurality of clusters, and for each cluster of the plurality of clusters, forming a plurality of m-sets by mapping at least k records from amongst the plurality of records to a pattern from amongst the plurality of patterns based on the generalized information loss incurred. Also, the method includes computing, via the one or more hardware processors, a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set. Further, method includes computing, via the one or more hardware processors, a post-risk score indicative of a second level of risk assessment, wherein the post-risk score is computed as a total percentage of m-sets having a diversity metric greater than a threshold and the set of risky records being part of the diverse sets. Performing the second level of risk assessment comprises determining, from amongst the plurality of m-sets a set of m-sets having the diversity metric greater than a predefined threshold value to obtain a plurality of diverse sets, and determining whether the set of risky records belong to the plurality of diverse sets and a total predefined percentage of the sets are diverse.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Typically, organizations possess a vast amount of personal data associated with individuals including customers, employees, patients as so on. For instance, organizations routinely collect data about their employees, vendors, and customers, and may need to publish some of it for purposes of transparency, audits, legal directives or support business processes. Publishing such data puts personal privacy at risk by making identification of individuals possible and expose their personal or sensitive information. In order to mitigate this risk data anonymization practices are put in place wherein, either the sensitive attributes are hided or masked using different strategies.

The existing masking solutions either replace PII/sensitive attributes with random values or shuffles them that causes huge data distortion affecting the data utility. An example of state-of-art data anonymization frameworks is described with reference to FIGS. 1A and 1B.

Figure 1A:
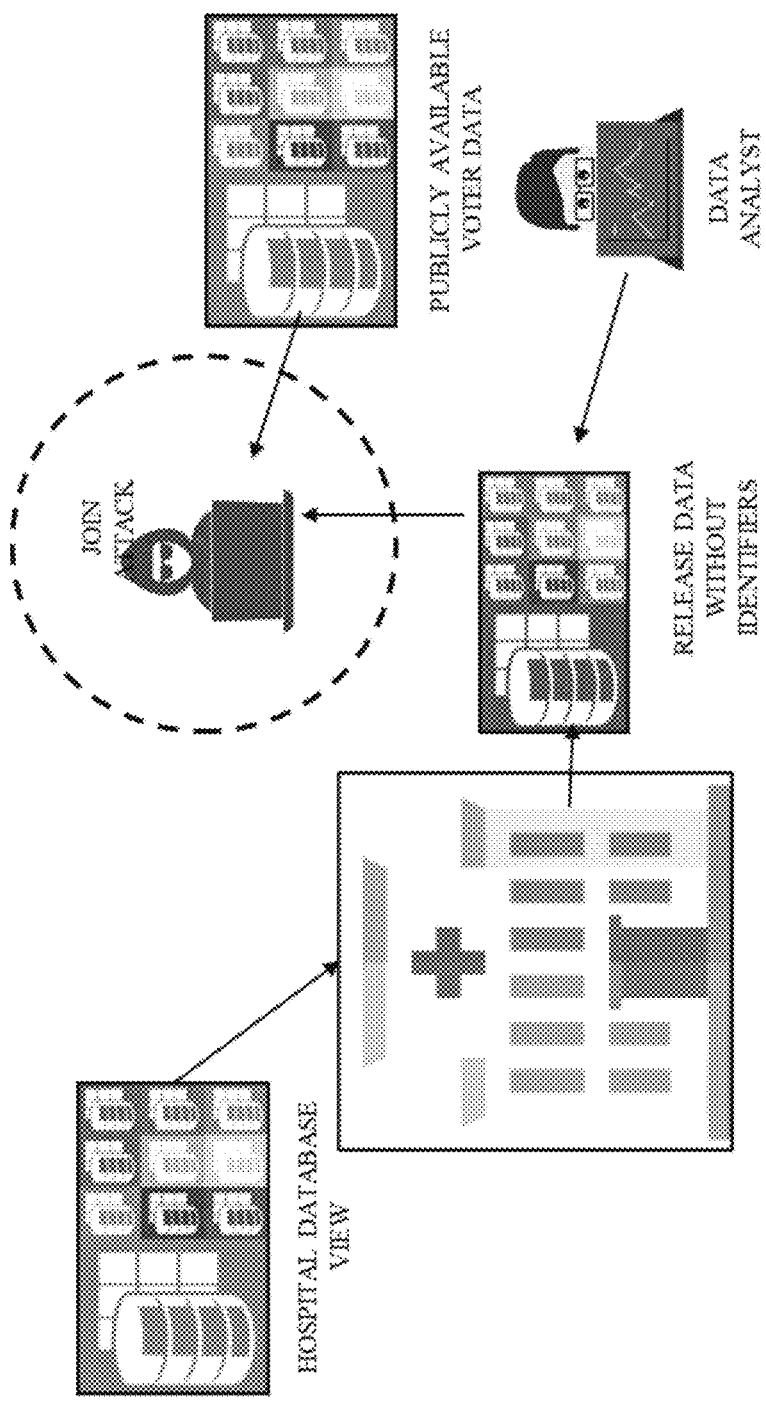
FIG. 1A illustrates a conventional data anonymization system.
Figure 1B:
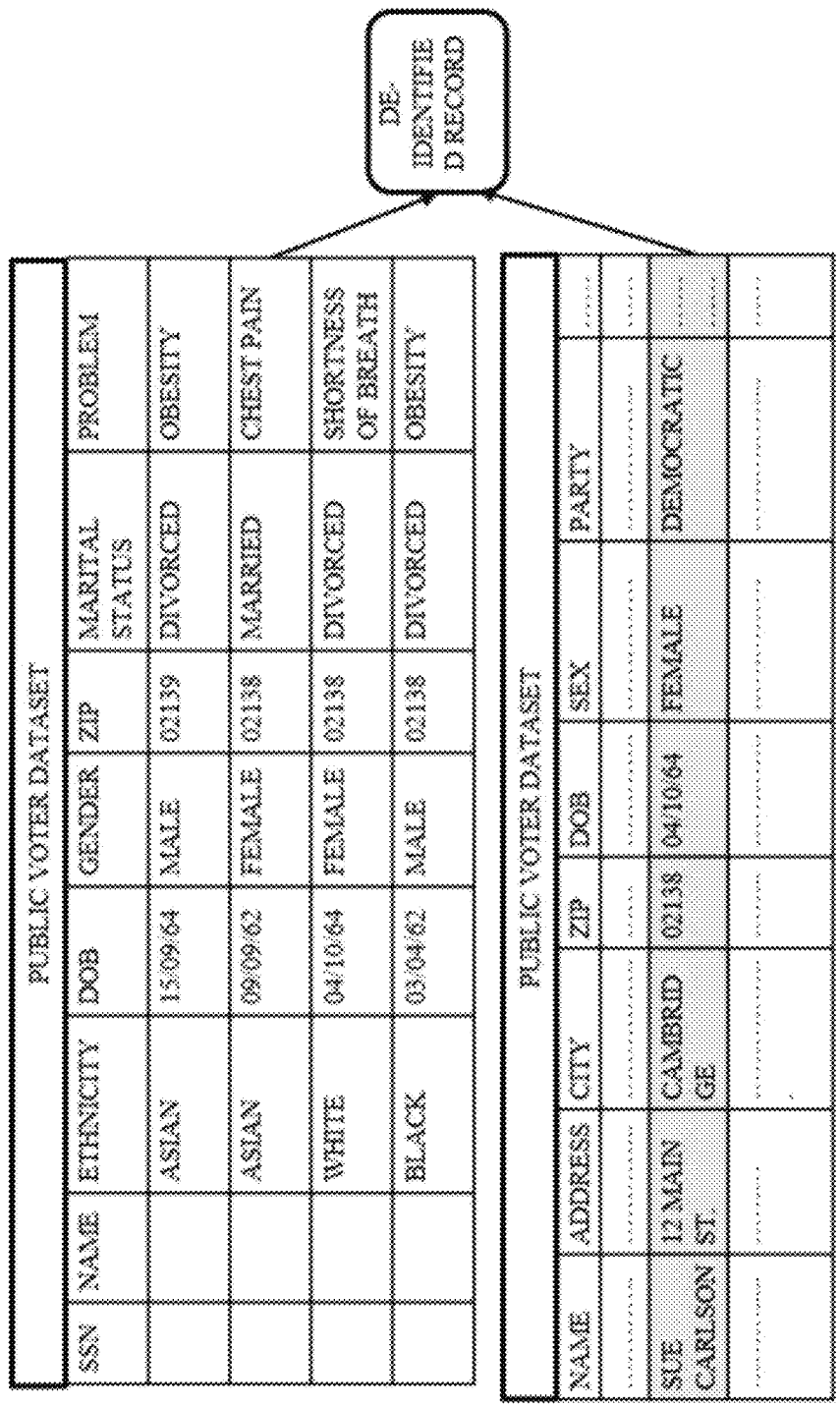
FIG. 1B illustrates an example of data leakage using the conventional data anonymization system of FIG. 1A.

FIG. 1A illustrates a conventional data anonymization framework. The disclosed example is from a healthcare institute that stores vast amount of personal data of its patients, if the hospital may share such data with interested agencies without any processing or minimal processing (for example by removing only the PII from the data, then the data can be misused by attackers. For instance, an attacker may combine this data released/shared by the hospital with publicly available voter data to obtain certain sensitive data of the patients. For instance as shown in FIG. 1B, the published hospital data may include data fields such as ethnicity, date of birth, gender, ZIP code, marital status and physical problem for which the hospital was consulted by the respective patients. Note that the PIIs are already removed from this dataset.

Now, an attacker may combine the hospital dataset with a voting dataset comprising, for example, name, address, city, ZIP code, date of birth, sex, party etc., of the individuals to obtain information such as the health problem with certain individuals. Such data leakage can severely harm any person emotionally and economically.

The goal of publishing data is best achieved when privacy is balanced with extracting maximum utility out of data. Moreover, to ensure privacy, assessing the risk of disclosure becomes a necessary condition. Data anonymization techniques involves generalization and suppression that relies on discovery of quasi-set of attributes among data. This requires domain knowledge that is non-trivial to guess in many situations. In addition, the conventional systems either directly anonymizes the data using existing technique or using static policies to anonymize with the help of human intervention. Such methods rely hugely on human intervention in different phases to perform anonymization.

The disclosed system and method provide a robust mechanism to automatically identify the domain and patterns associated in the given database. For example, the disclosed anonymization system 200 illustrated in FIG. 2 automates most of the pipeline to reduce the human effort in anonymization along with quantifying the level of anonymization based on the identified risks. Moreover, the proposed system is capable enough in terms of extensibility, flexibility and adaptability. The disclosed method and system propose data anonymization that is performed based on the risk assessment of the input dataset such that a balance between privacy and utility is achieved. For example, in an embodiment, the disclosed system provides a pipeline for analysis of the data patterns to understand the associated risk level of re-identification of records. Further, it anonymizes the data into clusters and associated identified patterns in order to minimize identification risk and information loss. An important contribution of the disclosed embodiments is pre-risk and post-risk assessment framework to mitigate the risk of re-identification of an individual in the dataset. Also, the method comprises of a unique clustering strategy to deal with high risk records identified in the pre-risk assessment phase, and finally performing anonymization to comply with the required measures using the post risk assessment phase. The system mitigates human intervention required in each of the phases leading to a solution of one click automation once the required input is given to the system.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Glossary of terms used in description of various embodiments

Definition 1 (Quasi-identifier attribute set): A quasi-identifier (QID) set is a set of attributes which can be combined together to identify an individual in the table of records (or dataset). For example, attribute set {Gender, Age, Zip code} in Table 1 is a quasi-identifier. These quasi-identifiers are sufficiently well co-related such that their combination can act as identifying information.

Definition 2 (Equivalence class). An equivalence of a table is defined as set of records which have identical QID value for all QID attributes in the QID set. For example, record 1, 2, and 3 in Table 1 is one equivalence class.

TABLE 1

| No. | Gender | Age | Zip | Problem |
|---|---|---|---|---|
| 1 | Male | middle | 4350 | stress |
| 2 | Male | middle | 4350 | obesity |
| 3 | Male | middle | 4350 | obesity |
| 4 | Female | middle | 4352 | stress |
| 5 | Female | old | 4354 | stress |
| 6 | Female | old | 4353 | obesity |

Definition 3 (K-Anonymity property). Any table is said to be satisfy K-Anonymity property if the size of each equivalence class in an anonymized table is greater than or equal to k. Table 1 does not satisfy 2-Anonymity as equivalence class {female, old, 4354} has only one record in the table.

Definition 4 (K-Anonymization) It is a process to transform any table to a table which satisfy K-anonymity property. There are two ways for k-Anonymization, namely global recoding and local recoding. In global recoding, the generalization happens in domain. When an attribute value is generalized, every occurrence of the value is replaced by the same new generalized value. In local recoding, generalization happen at a cell level. For any value, many different levels of generalization value can co-exist in the anonymized table. As in global generalization, generalization happen at the domain level, so there is more data distortion.

Definition 5 (Generalized Information Loss(GenILoss)) Data Utility is an important part of data anonymization. In the present embodiments, this metrics (GenILoss) is used to quantify data utility. This metrics capture the penalty incurred when generalizing a specific attribute, by quantifying the fraction of the domain values that have been generalized.

Let $L_i$, and $U_i$ are the lower limit and upper limit of attribute i respectively. A record j entry for attribute i is generalized by lower limit $L_{ij}$ and upper limit $Li_{ij}$. The overall information loss of an anonymized table T* is calculated as:

$$GenILoss(T^*) = \frac{1}{|T|, n} X \sum_{i=1}^{n} \sum_{j=1}^{|T|} \frac{U_{ij} - L_{ij}}{U_i - L_i} \quad (1)$$

Where T is original table, n is the number of attributes and |T| is number of records.

This metrics (GenILoss) is based on the fact that given a generalized value of attribute which have larger range, has less precision than specific value which have smaller range. Here, lower the value, the better it is. Value 'zero' represent no transformation and the value of '1' represent full suppression or maximum level of generalization of attribute. This above defined formula is defined for numerical attributes. This metric is also defined for categorical attributes. Here, each leaf node is mapped to integer and the above formula can be applied.

Figure 3A:
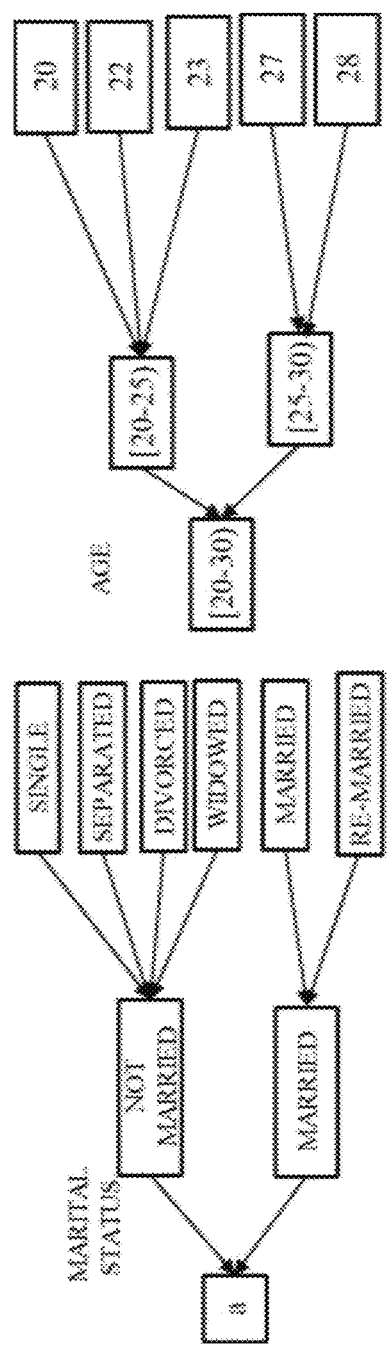
FIG. 3A illustrates an example representation of generalization loss computation for data anonymization according to some embodiments of the present disclosure.

Illustration: For marital status refer FIG. 3A, single is mapped to 1, separated mapped to 2 and so on till remarried to six. The GenILoss for the cell value "not married" is $$\frac{4-1}{6-1} = \frac{3}{5}.$$

Numerator represent that 'not married' is a generalized form of [1,4]. For age, which is numerical attribute, the GenILoss for cell value with the value [25-30] is $$\frac{29-25}{29-20} = \frac{4}{9}$$

Definition 6 (Generalization height) Each of the attributes can be generalized to different level according to its taxonomy tree. The level to which the value is generalized is referred to as generalization height.

Definition 7 (Level): Sum of generalization height of all the attributes of a record is defined as level of generalization for that record.

Figure 2:
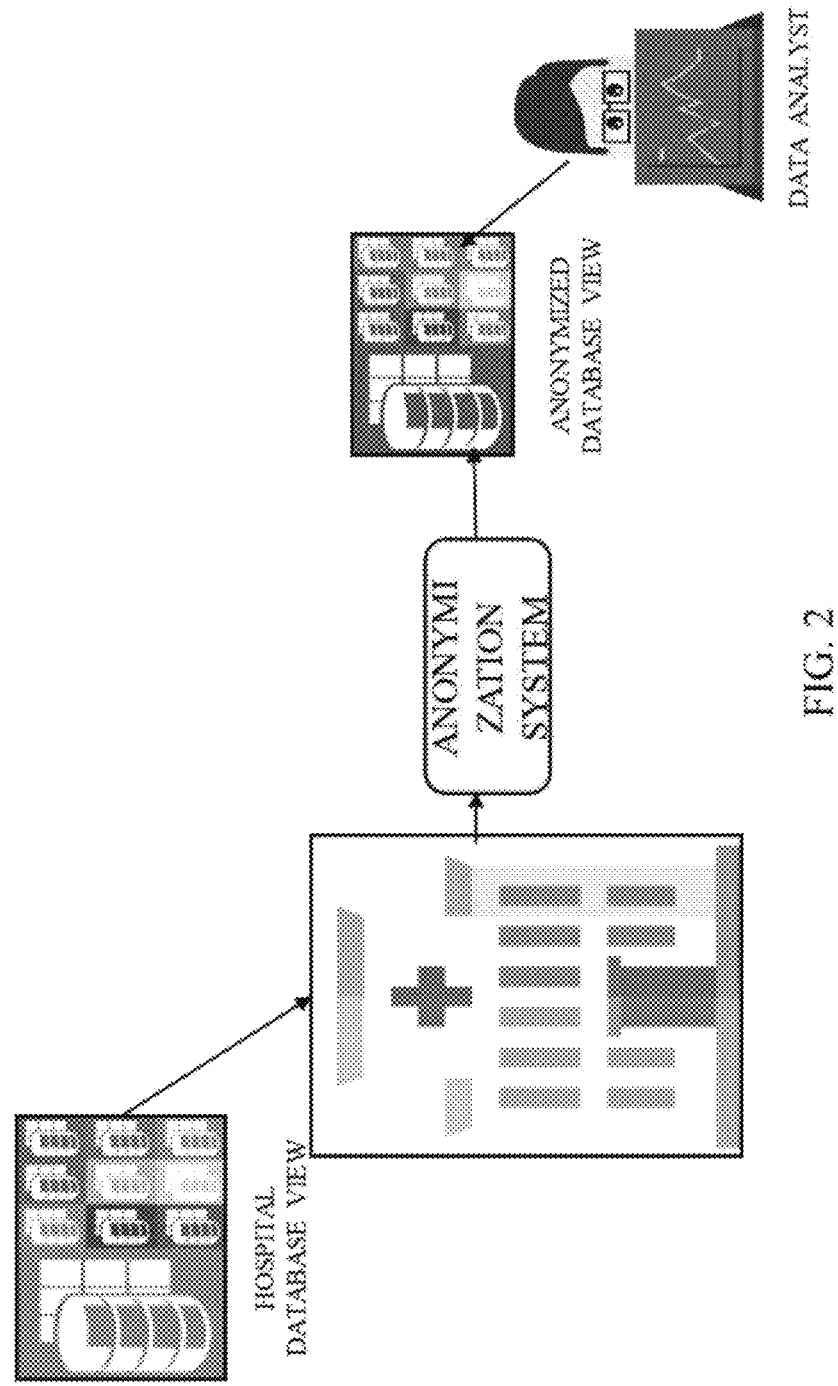
FIG. 2 is a representative framework of a risk aware data anonymization system according to some embodiments of the present disclosure.

Definition 8 (Level Combination) A record can be generalized into many ways depend on the number attributes and their taxonomy trees height. For a given level, all the possible combination of generalization is level combination. FIG. 2 is showing all level combinations for level 1.

Definition 9 (Weighted Hierarchical Distance). Let h be the height of domain generalization of a given attribute and generalization heights are defined as 1, 2, ... h−1, h from most specific to most general. Let the weight of generalization from generalization from j−1 to j is $w_{j-1,j}$, where $2 \leq j \leq h$. When a cell is generalized from level p to q, where p<q. The weighted hierarchical distance of this generalization is defined as:

$$WHD(pq) = \frac{\sum_{j=p+1}^{q} w_{j-1,j}}{\sum_{j=2}^{h} w_{j-1,j}} \quad (2)$$

Figure 3B:
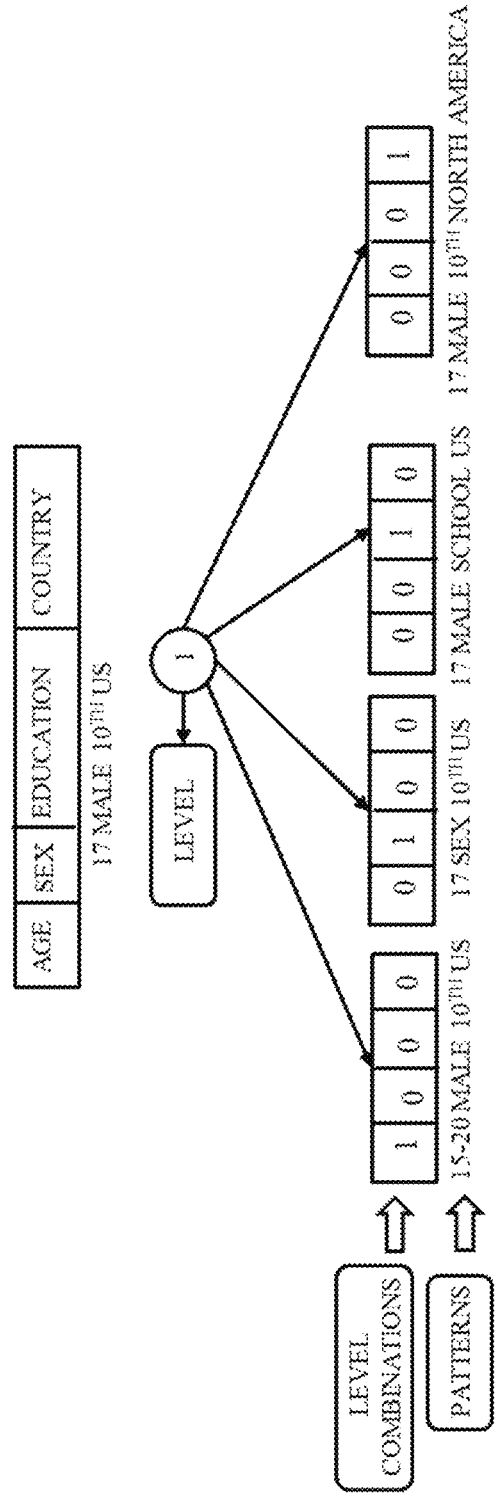
FIG. 3B illustrates an example of pattern generation through records and level combinations for data anonymization according to some embodiments of the present disclosure.

Definition 10 (Patterns) It is a generalization of a record. Patterns are generated through level combination and records. FIG. 3B shows how patterns are generated through records and level combinations. First, for a given level, all possible level combinations are created as shown in FIG. 3B. Then patterns are formed by generalizing each attribute to the generalization height mention in the level combinations.

Referring now to the drawings, and more particularly to FIGS. 1A through 8, where similar reference characters denote corresponding features consistently throughout the figures, there are shown preferred embodiments and these embodiments are described in the context of the following exemplary system and/or method.

Figure 4:
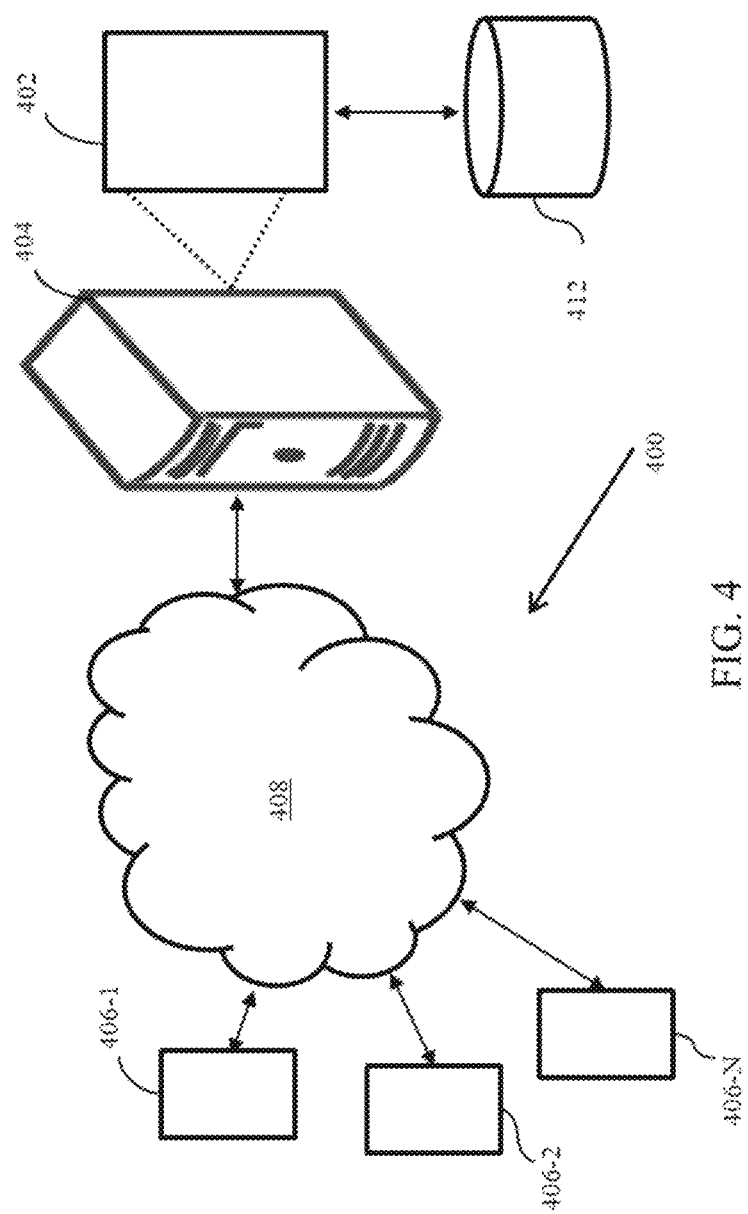
FIG. 4 illustrates an exemplary network implementation of a risk aware data anonymization system according to some embodiments of the present disclosure.

FIG. 4 illustrates an exemplary network implementation 400 of a system 402 for data anonymization according to some embodiments of the present disclosure. The disclosed embodiments apply to the cases as depicted below in FIGS. 1A and 1B which shows a data holder such as a hospital, that has a privately held collection of person-specific, field structured data.

Suppose the data holder wants to share a version of data with data analyst, then to ensure that the data holder releases a version of its private data with scientific guarantees that the individuals who are the subjects of the data cannot be re-identified while the data remains practically useful. The disclosed system provides a pipeline for processing the data and analyzing the processed data to determine a risk of exposure of the data, and finally performing anonymization to mitigate the risk of re-identification. The disclosed system differentiates by performing partial automation and reducing the human intervention to its maximum capacity.

Although the present disclosure is explained considering that the system 402 is implemented on a server, it may be understood that the system 402 may also be implemented in a variety of computing systems 404, such as a laptop computer, a desktop computer, a notebook, a workstation, a cloud-based computing environment and the like. It will be understood that the system 402 may be accessed through one or more devices 406-1, 406-2 . . . 406-N, collectively referred to as devices 406 hereinafter, or applications residing on the devices 406. Examples of the devices 406 may include, but are not limited to, a portable computer, a personal digital assistant, a handheld device, a smartphone, a tablet computer, a workstation and the like. The devices 406 are communicatively coupled to the system 402 through a network 408.

In an embodiment, the network 408 may be a wireless or a wired network, or a combination thereof. In an example, the network 408 can be implemented as a computer network, as one of the different types of networks, such as virtual private network (VPN), intranet, local area network (LAN), wide area network (WAN), the Internet, and such. The network 406 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 408 may include a variety of network devices, including routers, bridges, servers, computing devices, storage devices. The network devices within the network 408 may interact with the system 402 through communication links.

As discussed above, the system 402 may be implemented in a computing device 404, such as a hand-held device, a laptop or other portable computer, a tablet computer, a mobile phone, a PDA, a smartphone, and a desktop computer. The system 402 may also be implemented in a workstation, a mainframe computer, a server, and a network server. In an embodiment, the system 402 may be coupled to a data repository, for example, a repository 412. The repository 412 may store data processed, received, and generated by the system 802. In an alternate embodiment, the system 402 may include the data repository 412.

The network environment 400 supports various connectivity options such as BLUETOOTH®, USB, ZigBee and other cellular services. The network environment enables connection of devices 406 such as Smartphone with the server 804, and accordingly with the database 412 using any communication link including Internet, WAN, MAN, and so on. In an exemplary embodiment, the system 402 is implemented to operate as a stand-alone device. In another embodiment, the system 402 may be implemented to work as a loosely coupled device to a smart computing environment.

Figure 5A:
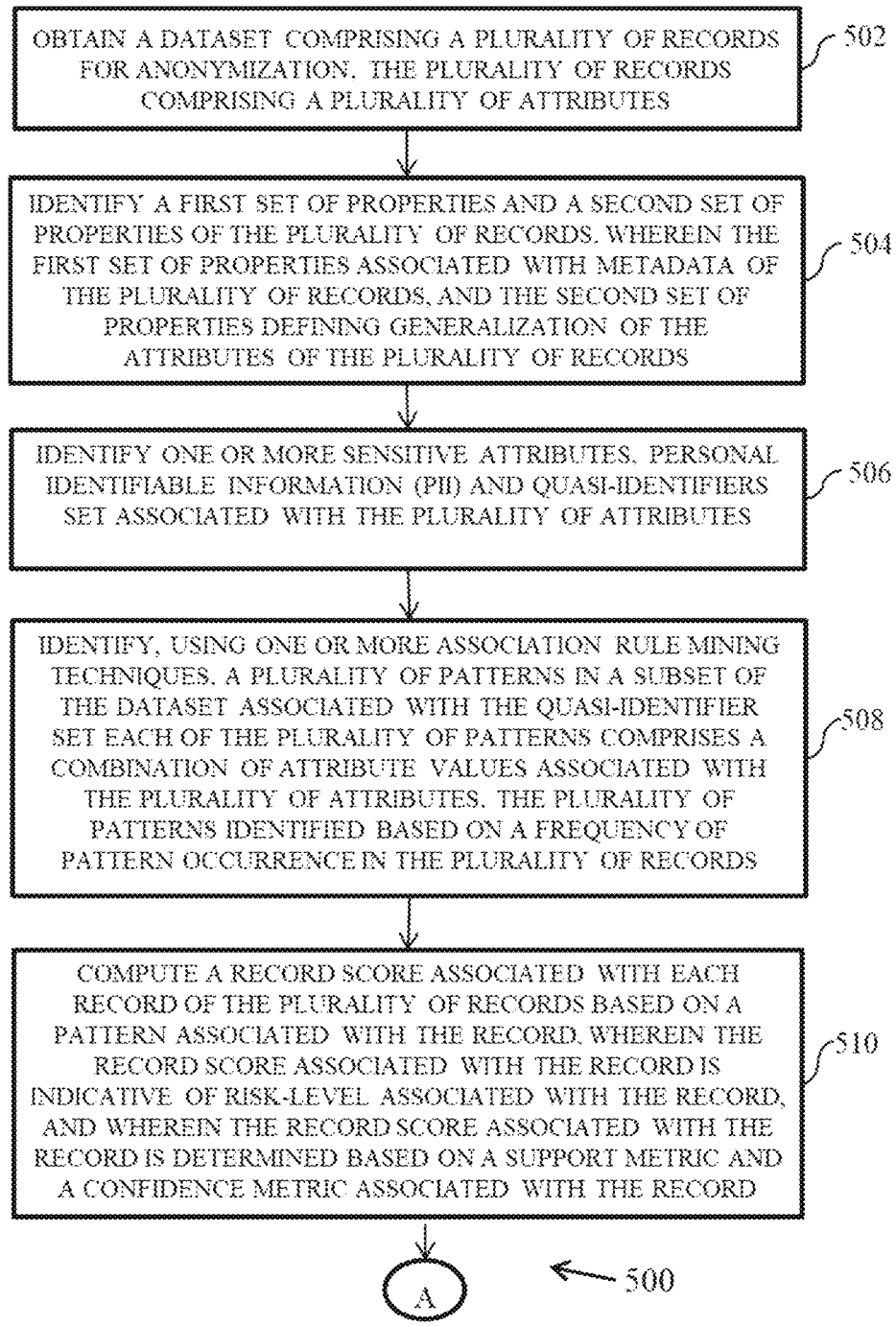
FIGS. 5A-5B is a flow chart illustrating a method for a risk aware data anonymization in accordance with some embodiments of the present disclosure.
Figure 5B:
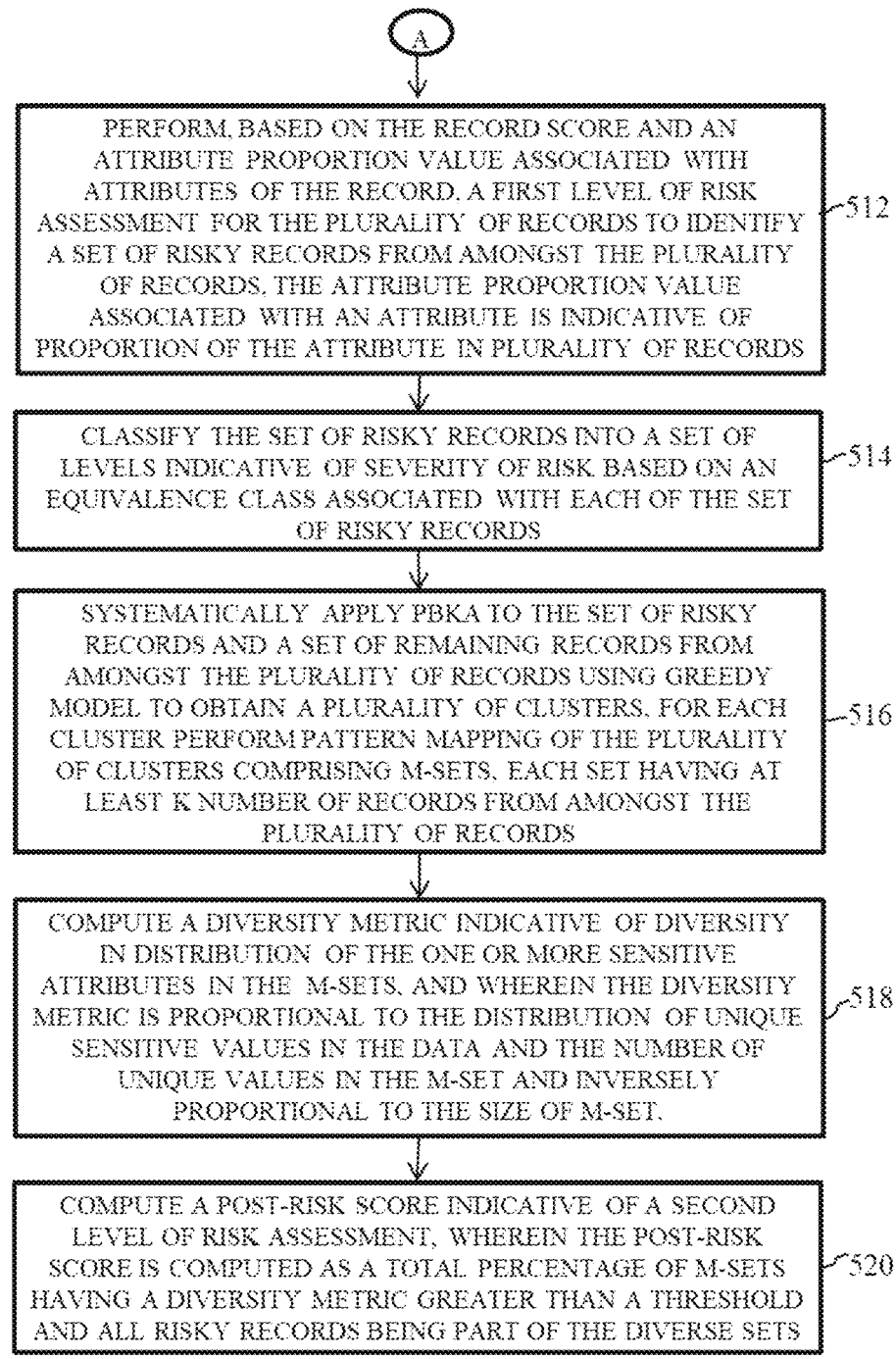
Figure 6:
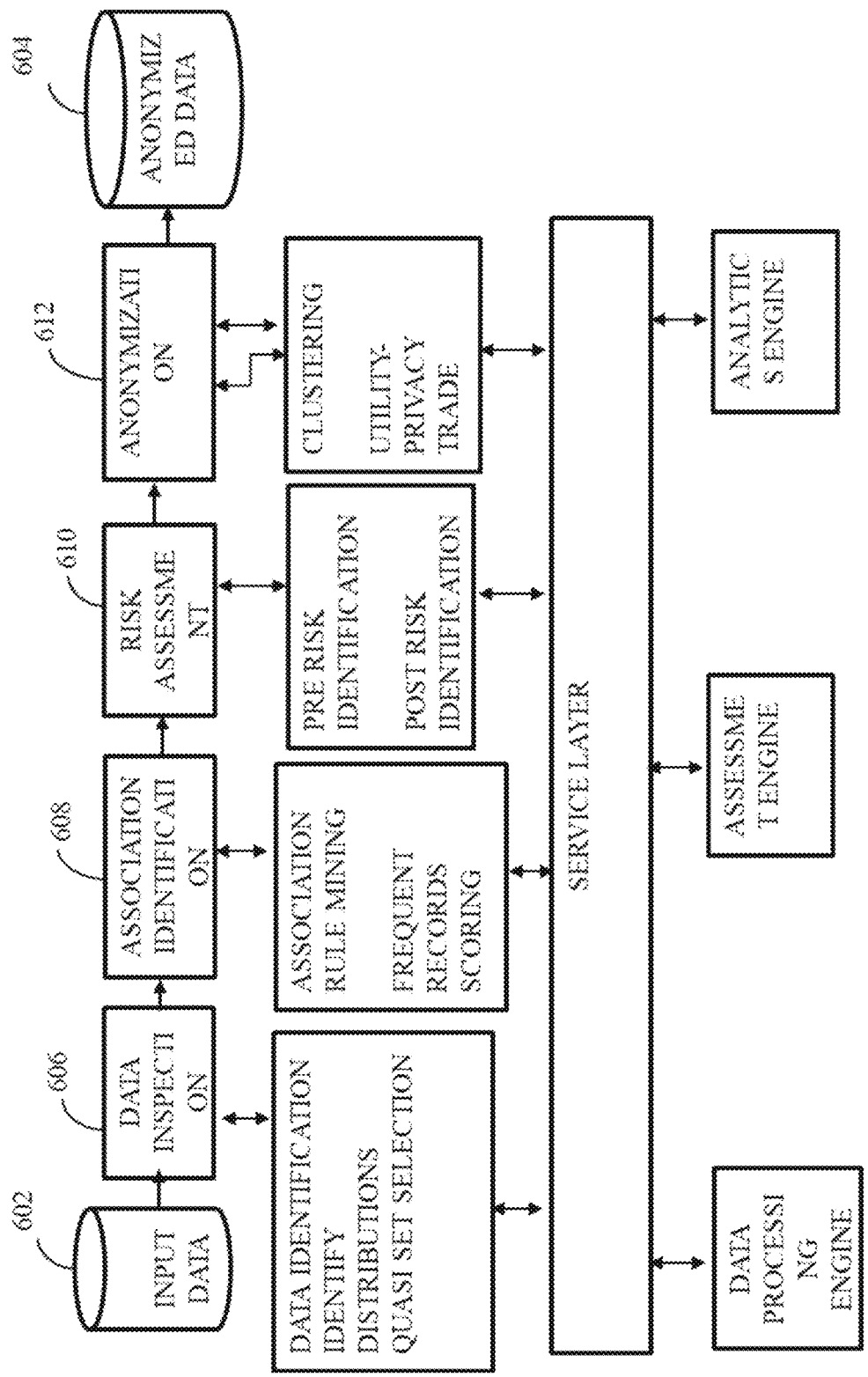
FIG. 6 illustrate a pipeline for risk aware data anonymization in accordance with some embodiments of the present disclosure.

A method for risk aware data anonymization at the disclosed system and a pipeline of the disclosed system are described further in detail with reference to FIGS. 5A-5B, and FIG. 6 respectively. Referring collectively FIGS. 5A-5B and 6, a flowchart of a method at a system and a pipeline for risk aware data anonymization, respectively are presented with reference to the disclosed embodiments. For instance, an example flow chart of a method 500 for risk-aware data anonymization, in accordance with an example embodiment of the present disclosure. In an example embodiment, the system 402 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 402. However, the operations of the method 400 can be described and/or practiced by using any other system.

The disclosed method and system processes and analyzes a dataset, and then applies a hybrid strategy for anonymization of the dataset. The processing and analysis of the initial dataset and application of the hybrid strategy on the processed dataset are described further in detail.

The system 600 takes an original dataset 602 as input, processes the dataset 602 and applies the hybrid anonymization strategy to obtain an anonymized dataset 604. The architecture of the disclosed system 600 includes a data inspection module 606, a pattern identification module 608, a risk assessment module 610, and an anonymization module 612.

At 502, the method 500 includes obtaining the dataset 602 having a plurality of records for anonymization. The plurality of records may include a plurality of attributes, and corresponding attribute values for each of the records. At 504, a first set of properties and a second set of properties of the plurality of records are identified from the dataset. The first set of properties may be explicit properties of the dataset are associated with metadata of the plurality of records such as the datatype of each of the attributes (such as numeric and categorical attributes), co-related attributes, the nature of distributions for example, skewness, primary and sensitive attributes, outlier analysis and dispersion of categories involved in each of the attributes. The second set of properties may be implicit properties of the dataset and defines generalization of the attributes of the plurality of records. In an embodiment, the implicit attributes may be the domain expert knowledge that is either incorporated using a global dictionary or is taken as an input to the system by user. This domain knowledge also includes taxonomy trees that define generalization of attributes depending upon the levels of the tree. The data inspection may also identify one or more sensitive attributes, personal identifiable information (PII) and quasi-identifiers set associated with the plurality of attributes that are sufficient to identify a person uniquely in a dataset. In an embodiment, the data inspection module 606 is responsible for identifying the explicit as well as implicit properties of the attributes in the dataset 602. Herein during the data inspection steps, values of records associated with the one or more sensitive attributes and PIIs of the individuals are removed so that only the values of attributes associated with the quasi-identifier set remains in the processed dataset which is a subset of the processed dataset. An example of data inspection for a record is illustrated with reference to FIG. 7A. In an embodiment, the At 508, the method 500 includes identifying a plurality of patterns in a subset of the dataset associated with the quasi-identifier set using one or more association rule mining techniques. Example of the association rule mining techniques may include, but is not limited to, a apriori algorithm. The identification of the patterns may be performed by the pattern identification module 608. The pattern identification module 608 identifies the patterns based on a frequency of pattern occurrence in the plurality of records. In an embodiment, the combination of attribute values that have a high occurrence in the records may be identified as patterns. In an embodiment, the frequency of occurrence is denoted by notion of support and the conditional probability associated with that pattern is denoted by confidence. These aforementioned notions to score the records is based on the obtained frequent patterns. An example of frequent patterns can be seen in the table 2 below:

TABLE 2

| Age | Education | Zip | Gender | Salary |
|---|---|---|---|---|
| 22 | Bachelors | 02319 | Female | <50 k |
| 46 | PhD | 02320 | Male | >50 k |
| 33 | PhD | 02320 | Male | >50 k |
| 15 | $10^{th}$ | 02312 | Female | <50 k |
| 25 | Bachelors | 02811 | Female | <50 k |
| 28 | PhD | 02811 | Male | >50 k |

In the above table, frequent patterns include, for example, {PhD, 02320}, {PhD, Male}, and {PhD, 02320, Male}.

At 510, the method includes computing a record score associated with each record of the plurality of records based on a pattern associated with the record. The record score associated with the record is indicative of risk-level associated with the record. In an embodiment, the record score associated with the record is determined based on a support metric and a confidence metric associated with the record. The scoring of each record, i.e. the record score may be performed as follows:

For a record, if the frequent patterns is present for example, [Age:15, Education: $10^{th}$ class, Marital Status: Not Married] then the record score for the record equals:

$$\text{Record Score} = \sum_{p_{ij}}^{n} w_{support} * p_{ij} + w_{confidence} * p_{ij}$$

where, $p_{ij}$ denotes the frequent pattern present in the record with attributes as i→j, i being the antecedent and j being the consequent and n being the possible number of combinations of i→j frequent patterns within a record i.e (Education: 10th, Martial status: Not Married) being treated as one pattern and (Age:15, Education:10th) in this manner leading to two or more possible combinations.

Otherwise, if the record consists of none of the frequent patterns the score may be assigned as zero. Thus, records with higher positive score indicates that the records are most frequent compared to others.

In an example embodiment, the weights for support and confidence can be taken as 0.4 and 0.6 respectively. Herein a higher weight is associated with the confidence since its determinant of conditional occurrence of the pattern rather than just a frequency indicator.

Based on the record score and an attribute proportion value associated with attributes of the record, the records which have a high risk of re-identification due to their rare pattern in the data are identified. In an embodiment, a first level of risk assessment for the plurality of records is performed at 512 to identify a set of risky records from amongst the plurality of records. The attribute proportion value associated with an attribute is indicative of proportion of the attribute in plurality of records. In an embodiment, the risk assessment of the records is performed by the risk assessment module 610.

$$av=Tv/T$$

av→attribute proportion for a specific value of attribute
Tv→total records where attribute value is v
T→Total records An example of the records made bold in the below table may be high risk records due to lowest variability in sensitive class.

TABLE 3

| AGE | EDUCATION | ZIP | GENDER | SALARY |
|---|---|---|---|---|
| 22 | Bachelors | 02319 | Female | <50 k |
| 46 | PhD | 02320 | Male | >50 k |
| 33 | PhD | 02320 | Male | >50 k |
| 15 | $10^{th}$ | 02312 | Female | <50 k |
| 25 | Bachelors | 02811 | Female | <50 k |
| 28 | PhD | 02811 | Male | >50 k |

The risk assessment module 610 computes, for each of the different values in an attribute, the probability of risk level of the attributes. The probability values which lie below a predefined threshold are regarded as rare in presence for the corresponding attribute. Based on the prior scoring of records (into records score), the records are filtered out, for example with lowest scores and having a combination of attribute values with least probability. Such filtered out records are marked as high-risk records. An example of computation of the high-risk records (or the set of risky records) is presented below.

For the purpose of example, considering the following table:

| Gender | Marital status | Age | Disease |
|---|---|---|---|
| Male | Married | 40 | Pneumonia |
| Male | Not Married | 37 | Heart disease |
| Female | Not Married | 35 | Cold |
| Male | Married | 30 | Cold |
| Female | Married | 50 | Hypertension |
| Female | Married | 67 | Heart disease |
| Male | Married | 48 | Hypertension |

In the above table, the probability for different categorical values present for attribute Marital-Status is computed, where P(Married)=5/7
P(Not Married)=2/7

Thus, the presence of records with 'Not Married' as marital status is very low. Now, from the pattern identification performed previously, it is known that the score for records with combination of marital status as 'Not Married' is zero, thus these records can now be treated as risk records.

An algorithm for identifying (or the set of risky records) is presented below:

```
function highRiskRecords( ):
Input: RecordPatternsScores,Attributes,Records,low_threshold
Algorithm:
  1.      riskyRecords <– [ ]
  2.      for each a in attributes:
  3.          for each v in a:
  4.              compute a_v
  5.              if a_v > low_threshold
  6.                  store riskmap.add(a,v)
  7.      attributeCombinations <– generate and store attribute value
                  combinations from riskmap.
  8.      for each combination in attributeCombinations:
  9.          if combination in Records:
 10.              r <– fetch record
 11.              rlist.add(r)
 12.      for each recordCombination in rlist:
 13.          if RecordPatternsScores[recordCombination] == high:
 14.              if recordCombination.EquivalenClassProportion == low:
 15.                  riskyRecords.add(recordCombination)
 16.      return riskyRecords
```

The set of risky records are classified into a set of levels that are indicative of severity of risk based on an sensitive attribute associated with each of the set of risky records at 514. In an embodiment, the set of risky records may be classified as low risk, medium risk and high risk depending upon the distribution of their corresponding sensitive attribute values. For example, in the table presented above for heart disease as sensitive class, only two records are present and when combined with risk records the highlighted record has a highest probability of re-identification, thus based on some fixed threshold this record can be labelled as high risk record.

Once the dataset is preprocessed for pre-risk assessment, the preprocessed dataset may be k-anonymized by the anonymization module 612. The anonymization module 612 is responsible for carrying out the anonymization of data based on the discovery made in the previous modules. The goal of the disclosed system is to perform anonymization such that minimal information loss takes place. At 516, the method 500 includes systematically applying the proposed approach, Pattern Based k-anonymization (PBKA) to the set of identified risky records and a set of remaining records from amongst the plurality of records using a greedy model to obtain a plurality of clusters. Each cluster of the plurality of clusters comprising a number of m-set, where each m-set has at least k number of records from amongst the plurality of records which are generalized along the identified QID such that records belonging to same set are indistinguishable. In an embodiment, k-anonymization by the disclosed system includes a hybrid strategy to make data k-anonymous by using the record scoring obtained earlier with association rule mining and clustering the data followed by pattern mapping.

Let n be the number of records and k (k<=n) be a defined parameter then the optimal solution of the k-anonymity clustering is a set of clusters C={$c_1, c_2, \ldots, c_j$} such that all records are part of only one cluster, the sum of items in each duster equals the total n records in the database, sum of all intra-duster distances is minimized, and overall loss is minimized. Herein, clustering the data records to almost k clusters in the beginning reduces the system overhead for generalizing and mapping the valid patterns to the similar records merged together in clusters forming m-sets. This in turn reduces the complexity for large size datasets making the approach scalable. A method for systematically applying the PBKA to the set of risk records and the set of remaining records is described further in detail below:

Initially, a set of duster centers for the clusters obtained from the set of frequent records is initialized. Thereafter, a plurality of iterations are performed until a stopping criteria is met. In an embodiment, the stopping criteria includes one of (1) an exhaustion of the plurality of iterations and (2) determination that the mean square error loss is constant in a predefined set of iterations from amongst the plurality of iterations. Performing plurality of iterations includes selecting a record randomly from amongst the set of remaining records and the set of risky records. During the plurality of iterations, the record is selected from the set of remaining records first followed by selection from the set of risky records. For each record of the plurality of records, the distance is measured using a distance metric for each of the record from set of cluster centers. Each record is added to a cluster from amongst the set of clusters that is associated with a minimum value of the distance measured; In an embodiment, the distance comprises a penalized Weighted Hierarchical Distance (WHD). The penalized WHD is expressed using the following equation:

Penalized WHD(Distance$_{r1,r2}$)=WHD+Penalty where, when a cell is generalized from level p to q WHO of generalization is defined as $$WHD(pq) = \frac{\sum_{j=p+1}^{q} w_{j-1,j}}{\sum_{j=2}^{h} w_{j-1,j}}$$

wherein penalty=0, if the records $r_1$, $r_2$ belong to different class i.e. the corresponding sensitive attribute value, and penalty=Yi if records $r_1$, $r_2$ belong to different class, and $Y_i$=Total instances of class($i$)/Total instances The penalized WHO computed above is used as a distance metric during the clustering phase to compute the distance between the two records based on common generalization achievable over taxonomy tree.

A sum of mean square loss for each of the clusters formed is computed and the sum of mean square loss of current iteration is compared with a previous iteration. The mean square loss for each cluster is computed as sum of squared differences of each point in a cluster with the mean of that cluster followed by updating the cluster centers as the mean of that cluster. On determination of the sum of the mean square loss for a cluster in the current iteration less than or equal to the mean square loss in the previous iteration, the cluster associated with the current iteration is saved. For each cluster of the set of clusters, pattern mapping is performed to form the m-sets in each duster based on the generalized information loss. In an embodiment, for each record, patterns are identified for generalization and for each identified pattern generalized information loss is obtained. A pattern resulting in a minimal value of the generalized information loss is mapped to the record. An example of using generalized information loss is described with reference to FIG. 7B.

Figure 7A:
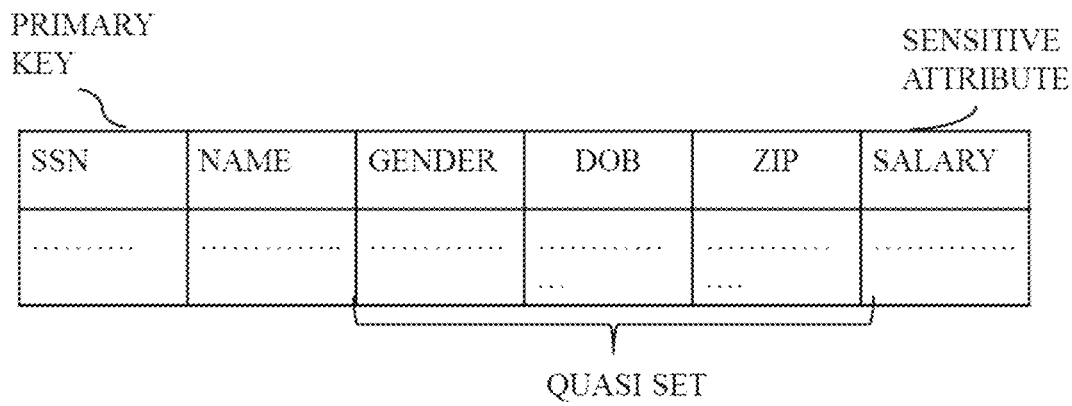
FIG. 7A illustrate an example of data inspection for risk aware data anonymization in accordance with some embodiments of the present disclosure.
Figure 7B:
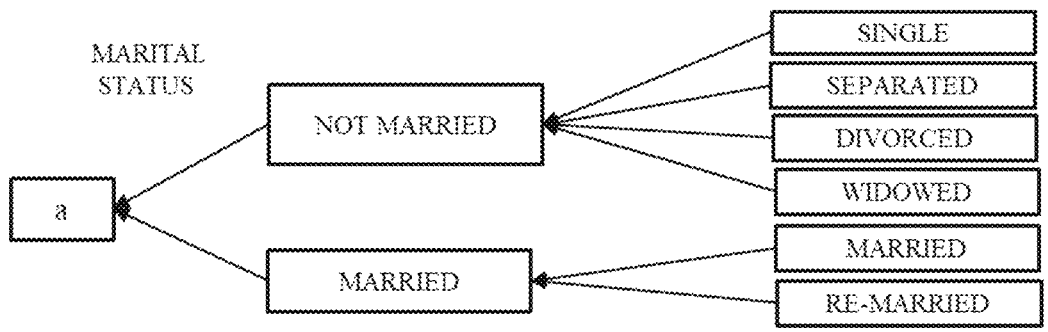
FIG. 7B illustrate an example of using generalized information loss for risk aware data anonymization in accordance with some embodiments of the present disclosure.

Referring to FIG. 7B an example, where the attribute 'marital status' comprises values not married' and 'married'. Further, for marital status, 'single' is mapped to 1, 'separated' is mapped to 2 and so on till remarried to 6.

GenILoss for the cell value "Not Married" is (4-1)46-1)= 3/5.

Numerator represent that not married is generalized form of [1,4].

An algorithm for the greedy clustering is presented below:
function PBKA(F, H, S n, k):
Input: F is the set of frequent record patterns, H is the set of high risk record patterns, S is the set of rest of the records, n is total records, k param for anonymity.
Output: m-sets with each set having at least k-records
Algorithm:
1. p<-k
2. {C1, C2, . . . , Cp}<-Choose p random centres from set F
3. x<≤|F|/p
4. For each c in {C1,C2, . . . , Cp}:
5. find nearest x records based on distance metric from set F and add to c
6. allocate records in set H and S to nearest cluster based on distance metric
7. if |F|>0:
8. distribute the additional records to nearest cluster based on distance metric
9. apply cluster re-center strategy and compute mean square loss
10. continue clustering if iterations not reached or mean square loss is not constant
11. for each cluster in {C1, C2, . . . , Cp}:
12. perform pattern mapping for each record by generating level combinations
13. compute information loss for the patterns generated
14. map the record to pattern with least information loss
15. form m-sets with records generalized to same patterns
16. if all m-sets size>=k
17. break
18. Output the obtained m-sets At 518, a diversity metric indicative of diversity in distribution of the one or more sensitive attributes in the m-sets present in a duster is computed. The diversity metric is computed as a ratio of number of sensitive attribute values to a total number of sensitive attribute values in each of the in-sets.

The Diversity Metric is computed for each of the m-sets formed. In an embodiment, the diversity metric is computed depending on the distribution of unique sensitive values in the entire dataset. For example: Let $D_1$, $D_2$, $D_3$, $D_4$, $D_5$ are the unique diseases of the sensitive attribute column and number of records with $D_1$=60, $D_2$=10, $D_3$=10, $D_4$=10, $D_5$=10 out total 100 records. Then, the ideal diversity is when this distribution is maintained in each m-set too. Thus, we compute diversity score for each m-set as follows: Proportion of each sensitive attribute value is computed. Example: for $D_1$=60/100=0.6.

For each m-set compute the summation of proportion of sensitive value multiplied by frequency of the sensitive value. This value is then multiplied by the number of unique sensitive values present in the m-set and then the obtained value is divided by the set size. This resulting value is diversity score of a set. Higher the value better is the diversity in the m-set.

In an embodiment, wherein only two sensitive attribute values are present. In such a case, the maximum diversity for an m-set is two, thus the necessary condition for each of the m-sets to be diverse is that the set should include at least one record from the two distinct sensitive values present. This will avoid the homogeneity of sensitive attribute in an m-set.

In an embodiment, the diversity metric is computed as below:

$$\text{Diversity Score } (m) = \frac{\left(\sum_{i=0}^{n} \text{proportion}_{S_i} * x_{S_i,m}\right) * y_m}{z_m}$$

wherein $\text{proportion}_{si}$ is defined as the ratio of total number of records with sensitive values i in the dataset to total number of records in the dataset, $x_{si,m}$ represents the total number of records in the $m^{th}$-set having $S_i$ as the sensitive value, $z_m$ represents the size of set and $y_m$ represents the total number of unique sensitive values in the $m^{th}$-set.

At 520, the method 500 includes computing a post-risk score indicative of a second level of risk assessment. The post-risk score is computed as a total percentage of m-sets having a diversity metric greater than a threshold and all risky records being part of the diverse sets. Hence for post risk assessment, the number of m-sets that have a diversity greater than a threshold value is computed, such set may be referred to as diverse sets. Thereafter it is determined whether the sets with risky records belong to the diverse sets and a total defined percentage (say around 80%) of the sets are diverse.

Figure 8:
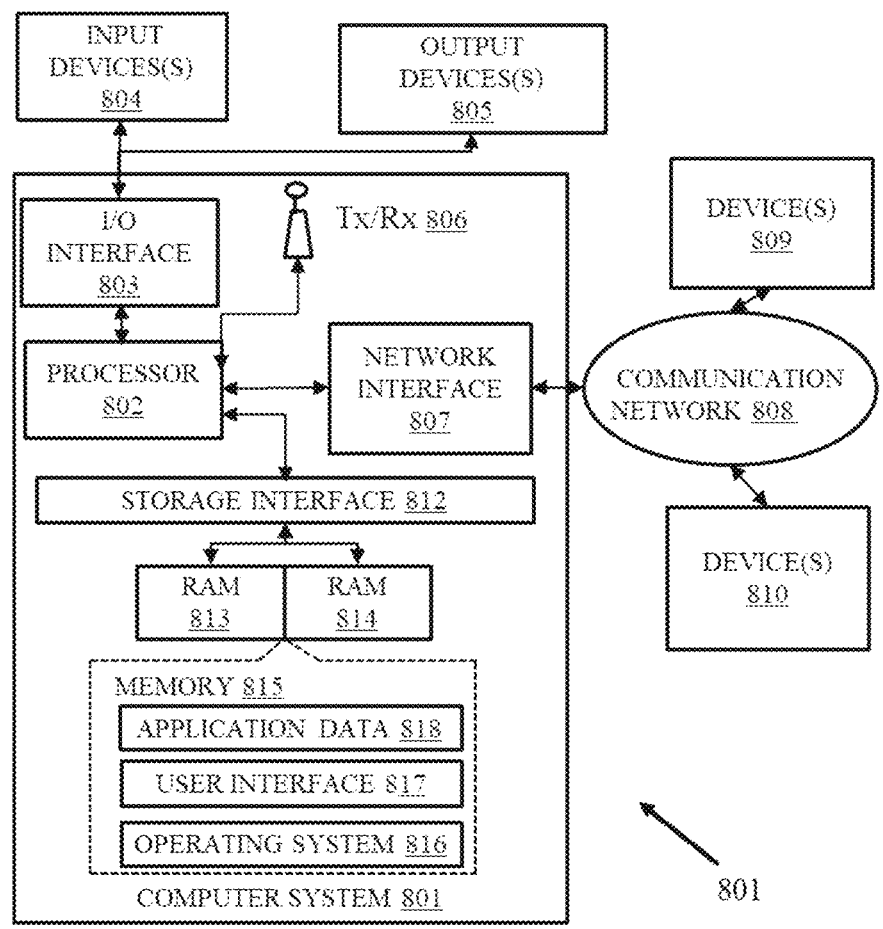
FIG. 8 is a block diagram of an exemplary computer system for implementing embodiments consistent with the present disclosure.

FIG. 8 is a block diagram of an exemplary computer system 801 for implementing embodiments consistent with the present disclosure. The computer system 801 may be implemented in alone or in combination of components of the system 402 (FIG. 4). Variations of computer system 801 may be used for implementing the devices included in this disclosure. Computer system 801 may comprise a central processing unit ("CPU" or "hardware processor") 802. The hardware processor 802 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 802 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/big/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G FiS-DPA/HSUPA communications, etc.

In some embodiments, the processor 802 may be disposed in communication with a communication network 808 via a network interface 807.

The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809 and 810. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the Ike. In some embodiments, the computer system 701 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 816, user interface application 817, user/application data 818 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 801 may store user/application data 818, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation.

For example, in some embodiments, some or all of the data used in the disclosed methods may be sourced from or stored on any cloud computing platform.

Example Scenario:

The performance of the disclosed system in terms of optimality and scalability was studied. The experiment compared the disclosed greedy algorithm with prior art in term of quality and running time.

TABLE 4

Dataset for example scenario

| S.No | Attribute | Cardinality | Generalization Height |
|---|---|---|---|
| 1 | Age | 74 | 4 |
| 2 | Gender | 2 | 1 |
| 3 | Race | 5 | 1 |
| 4 | Marital Status | 7 | 2 |
| 5 | Native County | 41 | 2 |
| 6 | Work Class | 8 | 2 |
| 7 | Occupation | 14 | 2 |
| 8 | Education | 16 | 3 |
| 9 | Salary Class | 2 | 1 |

An adult dataset for experimentation was considered. The dataset consist of 48842 records out of which 30000 records were considered for experimentation. Rows which have any missing value are dropped from dataset. Details of the dataset is mentioned in Table 4.

Figure 9A:
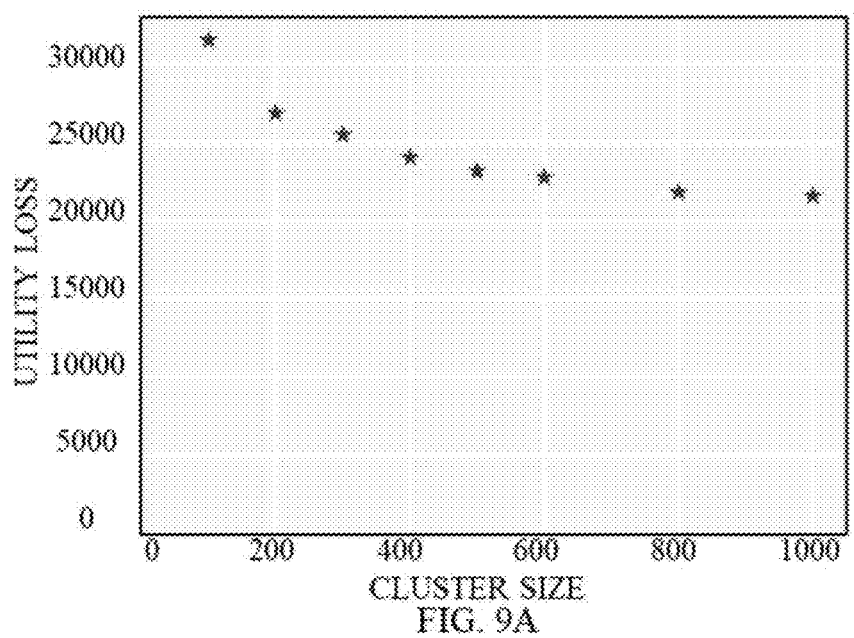
FIGS. 9A-9B illustrate variation of information loss and time with cluster size respectively, in accordance with an example embodiment of the present disclosure.
Figure 9B:
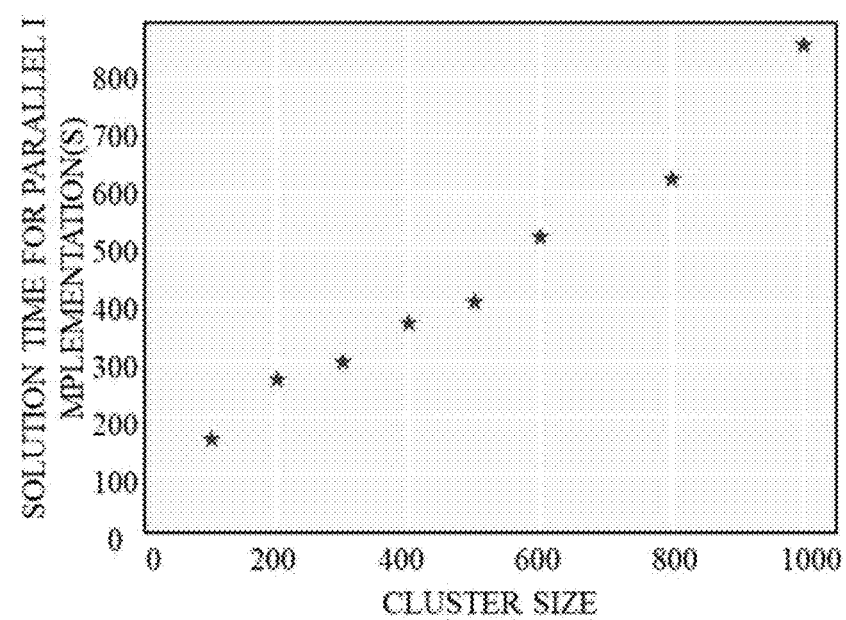

A tradeoff between GenILoss and cluster size was presented. If bigger cluster size is considered then there will be less GenILoss as it offers more options for anonymization but at the same time, the solution time will increase as computation is increasing, To verify this, PBKA was performed over 12000 records with k equal to 20 and cluster size varying from 100 to 1000 with step of 100. FIGS. 9A and 9B verify the same. Here, there is one important observation is that GenILoss is decreasing sharply for cluster size 100 to 400 and after 400 it got flatten, whereas, the solution time is increasing with constant rate. For further experiments, cluster size of 400 was taken.

Figure 10A:
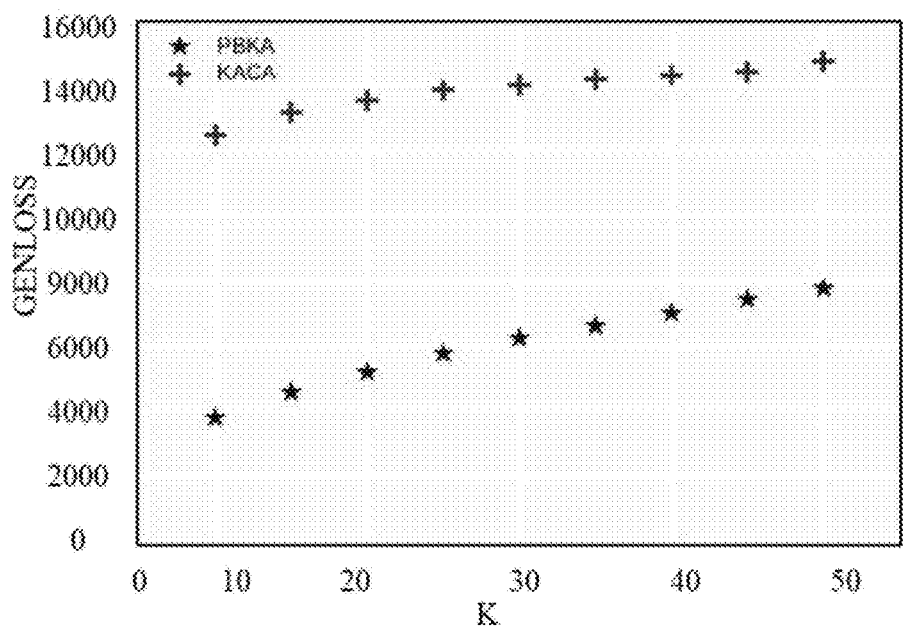
FIGS. 10A-10B illustrate variation of GenIloss with k, and variation of ratio of information loss in PBKA and KASA with k, respectively in accordance with an example embodiment of the present disclosure.
Figure 10B:
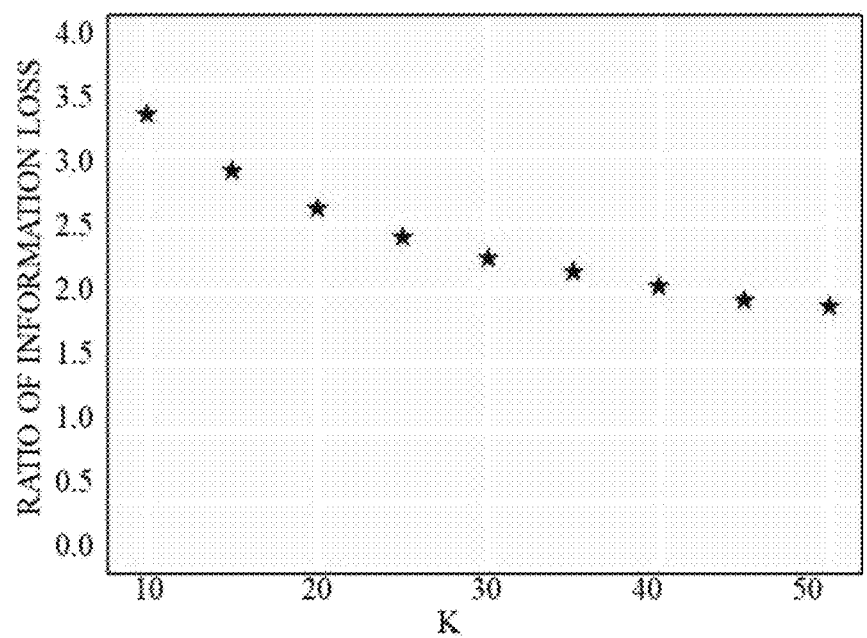

PBKA is compared with the KACA to demonstrate the performance in term of GenILoss. in FIG. 10A and FIG. 10B, it was shown that objective value of both algorithms and ratio of the objective value of these algorithms for different values of K. Here, 30000 rows were randomly picked from the adult dataset to reduce biasness. The number of attributes is set to 9 and cluster size is 400 for the result illustrated in FIGS. 10A and 10B. We observed that our PBKA achieves better utility than KACA in all the instances. The ratio of information loss in KACA and PBKA is decreasing. Ratio of information loss in KACA to PBKA is decreasing due to x cluster size.

Figure 11A:
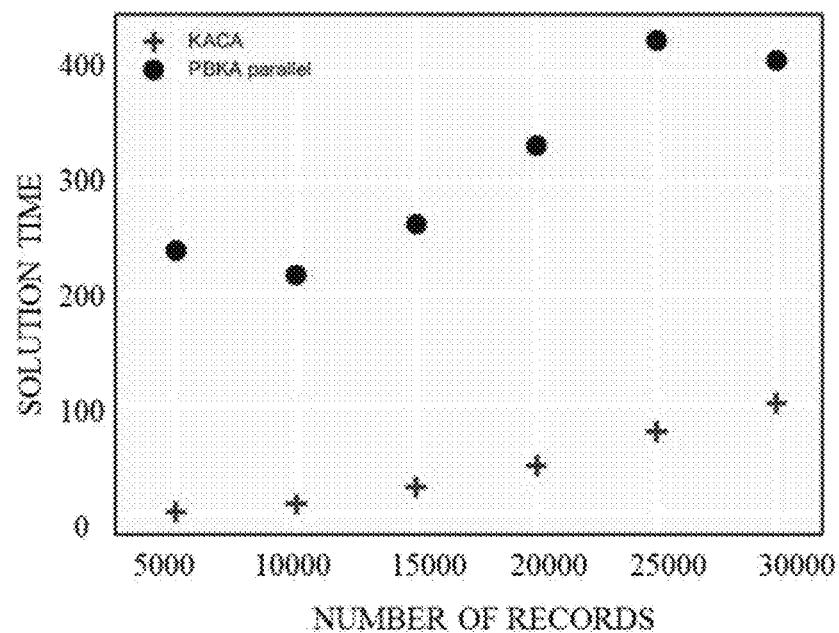
FIGS. 11A-11B illustrate variation of running time vs number of records, and ration of running time of PBKA and KASA with k, respectively, in accordance with an example embodiment of the present disclosure.
Figure 11B:
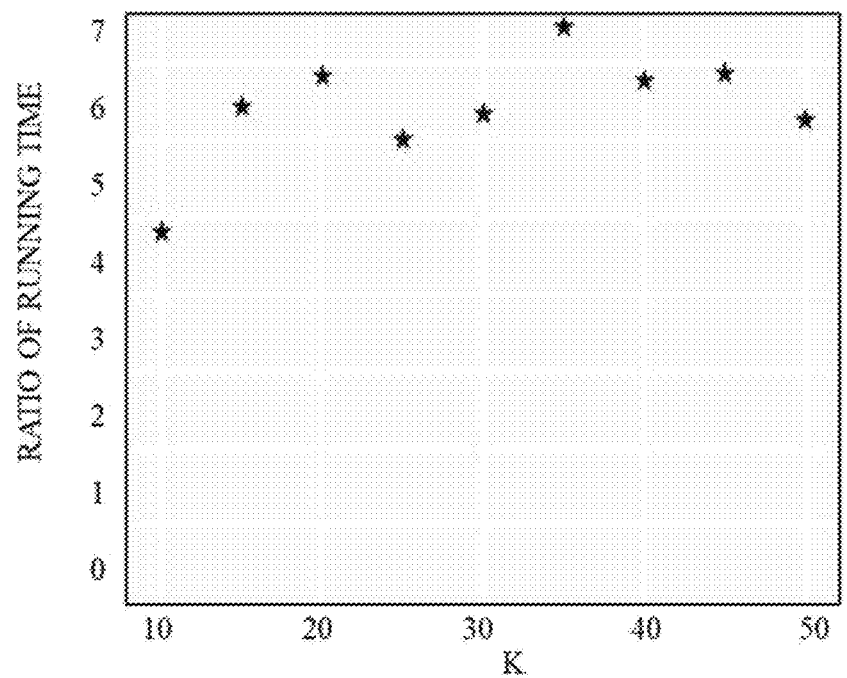

To demonstrate scalability, experiments were performed on 5000, 10000, 15000, 20000, 25000, and 30000 number of records. FIG. 11A shows the performance of both of the algorithms. Running time of both methods is increasing with increase in cluster size. KACA is performing better than PBKA in all instances. The ratio of running time of PBKA and KACA is from 5 to 7 times which is shown in FIG. 11B.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent dements with insubstantial differences from the literal language of the claims.

Various embodiments disclosed herein provides method and system for risk-aware data anonymization. The existing masking solutions either replace PII/sensitive attributes with random values or shuffles them that causes huge data distortion affecting the data utility. The goal of publishing data is best achieved when privacy is balanced with extracting maximum utility out of data. Moreover, to ensure privacy, assessing the risk of disclosure becomes a necessary condition. Data anonymization techniques involves generalization and suppression that relies on discovery of quasi-set of attributes among data. This requires domain knowledge that is non-trivial to guess in many situations. The proposed system provides a pipeline for analyses of the data patterns to understand the associated risk level of re-identification of records. Further, it anonymizes the data into clusters and associated identified patterns in order to minimize identification risk and information loss.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for risk aware data anonymization, comprising:
obtaining a dataset comprising a plurality of records for anonymization, the plurality of records comprising a plurality of attributes, via one or more hardware processors;
identifying a first set of properties and a second set of properties of the plurality of records, via the one or more hardware processors, wherein the first set of properties is associated with metadata of the plurality of records, and the second set of properties defines generalization of the attributes of the plurality of records;
identifying, via the one or more hardware processors, one or more sensitive attributes, personal identifiable information (PII) and quasi-identifiers set associated with the plurality of attributes;
identifying, using one or more association rule mining techniques, a plurality of patterns in a subset of the dataset associated with the quasi-identifier set, via the one or more hardware processors, each of the plurality of patterns comprises a combination of attribute values associated with the plurality of attributes, the plurality of patterns identified based on a frequency of pattern occurrence in the plurality of records;
computing, via the one or more hardware processors, a record score associated with each record of the plurality of records based on a pattern associated with the record, wherein the record score associated with the record is indicative of risk-level associated with the record, and wherein the record score associated with the record is determined based on a support metric and a confidence metric associated with the record;
performing, based on the record score and an attribute proportion value associated with the plurality of attributes of the record, via the one or more hardware processors, a first level of risk assessment for the plurality of records to identify a set of risky records from amongst the plurality of records, the attribute proportion value associated with an attribute is indicative of proportion of the attribute in plurality of records;
classifying, via the one or more hardware processors, the set of risky records into a set of levels indicative of a severity of risk based on the one or more sensitive attributes associated with each of the set of risky records;
systematically applying a pattern-based K-Anonymization (PBKA) to the set of risky records and a set of remaining records from amongst the plurality of records using a greedy model, via the one or more hardware processors, wherein applying the PBKA comprises:
clustering the set of risky records and the set of remaining records to obtain a plurality of clusters, and
for each cluster of the plurality of clusters, forming a plurality of m-sets by mapping at least k records from amongst the plurality of records to a pattern from amongst the plurality of patterns based on the generalized information loss incurred;
computing, via the one or more hardware processors, a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set;
computing, via the one or more hardware processors, a post-risk score indicative of a second level of risk assessment, wherein the post-risk score is computed as a total percentage of m-sets having a diversity metric greater than a threshold and the set of risky records being part of the diverse sets, wherein performing the second level of risk assessment comprises:
determining, from amongst the plurality of m-sets, a set of m-sets having the diversity metric greater than a predefined threshold value to obtain a plurality of diverse sets, and
determining whether the set of risky records belong to the plurality of diverse sets and a total predefined percentage of the sets are diverse.

2. The processor implemented method of claim 1, wherein the metadata of the plurality of records comprises one or more of datatype of each of the attributes, nature of distributions, skewness, outliers and dispersion of categories involved in each of the attributes.

3. The processor implemented method of claim 1, wherein the generalization of the attributes of the plurality of records is defined using taxonomy trees depending upon the levels of the taxonomy tree.

4. The processor implemented method of claim 1, wherein the record score associated with a record is determined using the following equation:

$$\text{Record Score} = \sum_{p_{ij}}^{n} w_{support} * p_{ij} + w_{confidence} * p_{ij}$$

wherein $w_{support}$ denotes a support metric, $w_{confidence}$ denotes a confidence metric and $p_{ij}$ denotes the frequent patterns present in the record with attributes as i→j, i being the antecedent and j being the consequent, and wherein the support metric and the confidence metric are predefined and n being the possible number of combinations of i→j frequent patterns within a record.

5. The processor implemented method of claim 1, wherein performing the first level of risk assessment comprises:
computing, for each of the different values in an attribute, a probability value of risk level of the attributes, wherein one or more attributes associated with probability values below a predefined threshold are regarded as rare attributes; and filtering one or more records from amongst the plurality of records as risky records based on the record score and association with the rare attributes.

6. The processor implemented method of claim 1, wherein systematically applying the PBKA using the greedy model comprises:

initializing a set of cluster centers from the set of frequent records;

until a stopping criteria is met, performing a plurality of iteration comprising:

selecting a record randomly from amongst the set of remaining records and the set of risky records, wherein during the plurality of iterations, the record is selected from the set of remaining records first followed by selection from the set of set of risky records;

computing, for each record of the plurality of records, a distance metric of each record from set of cluster centers, and adding each record to a cluster from amongst the set of clusters that is associated with a minimum value of the distance metric;

computing a sum of mean square loss for each of the clusters formed and comparing the sum of mean square loss of current iteration with a previous iteration, wherein the mean square loss for the each cluster is computed as sum of squared differences of each point in a cluster with the mean of that cluster followed by updating the cluster centers as the mean of that cluster;

on determination of the sum of the mean square loss for a cluster in the current iteration less than or equal to the mean square loss in the previous iteration, saving the cluster associated with the current iteration; and performing, for each cluster of the set of clusters, pattern mapping to form the m-sets in each cluster based on the generalized information loss, wherein for each record, patterns are identified for generalization, said patterns are obtained dynamically by combining different levels of taxonomy trees for the selected set of quasi-identifiers and for each identified pattern generalized information loss is obtained, and wherein a pattern resulting in a minimal loss is mapped to the record, and wherein the stopping criteria comprises one of an exhaustion of the plurality of iterations and determination that the mean square error loss is constant in a predefined set of iterations from amongst the plurality of iterations.

7. The processor implemented method of claim 6, wherein the distance metric comprises a penalized Weighted Hierarchical Distance (WHD), wherein the penalized WHD is expressed using the following equation:

Penalized WHD(Distancer1,r2)=WHD+Penalty where, when a cell is generalized from level p to q WHD of generalization is defined as $$WHD(pq) = \frac{\sum_{j=p+1}^{q} w_{j-1,j}}{\sum_{j=2}^{h} w_{j-1,j}}$$

weight of the generalization from level j−1 to j is w(j−1), j, where 2≤j≤h, and wherein penalty=0, if the records $r_1$, $r_2$ belong to different class (i) i.e. the corresponding sensitive attribute value, and penalty=Yi, if records $r_1$, $r_2$ belong to same class (i), and Yi=Total instances of class (i)/Total instances.

8. The processor implemented method of claim 1, wherein the diversity score for a m-set of the plurality of m-sets is computed using the following equation:

$$\text{Diversity Score } (m) = \frac{\left(\sum_{k=0}^{m} proportion_{S_i} * x_{S_i m}\right) * y_m}{z_m}$$

wherein, proportions is defined as the ratio of total number of records with sensitive values i in the dataset to total number of records in the dataset, $x_{si,m}$ represents the total number of records in the $m^{th}$-set having $S_i$ as the sensitive value, $z_m$ represents the size of set and $y_m$ represents the total number of unique sensitive values in the $m^{th}$-set.

9. A system for risk aware data anonymization, comprising:

a memory storing instructions;

one or more communication interfaces; and one or more hardware processors coupled to the memory via the one or more communication interfaces, wherein the one or more hardware processors are configured by the instructions to:

obtain a dataset comprising a plurality of records for anonymization, the plurality of records comprising a plurality of attributes;

identify a first set of properties and a second set of properties of the plurality of records, wherein the first set of properties is associated with metadata of the plurality of records, and the second set of properties defines generalization of the attributes of the plurality of records;

identify one or more sensitive attributes, personal identifiable information (PII) and quasi-identifiers set associated with the plurality of attributes;

identify, using one or more association rule mining techniques, a plurality of patterns in a subset of the dataset associated with the quasi-identifier set, each of the plurality of patterns comprises a combination of attribute values associated with the plurality of attributes, the plurality of patterns identified based on a frequency of pattern occurrence in the plurality of records;

compute a record score associated with each record of the plurality of records based on a pattern associated with the record, wherein the record score associated with the record is indicative of risk-level associated with the record, and wherein the record score associated with the record is determined based on a support metric and a confidence metric associated with the record;

perform, based on the record score and an attribute proportion value associated with the plurality of attributes of the record, a first level of risk assessment for the plurality of records to identify a set of risky records from amongst the plurality of records, the attribute proportion value associated with an attribute is indicative of proportion of the attribute in plurality of records;

classify the set of risky records into a set of levels indicative of a severity of risk based on the one or more sensitive attributes associated with each of the set of risky records;

systematically apply a pattern-based K-Anonymization (PBKA) to the set of risky records and a set of remaining records from amongst the plurality of records using a greedy model, wherein to apply the PBKA, the one or more hardware processors are configured by the instructions to:

cluster the set of risky records and the set of remaining records to obtain a plurality of clusters, and for each cluster of the plurality of clusters, form a plurality of m-sets by mapping at least k records from amongst the plurality of records to a pattern from amongst the plurality of patterns based on the generalized information loss incurred;

compute a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set;

compute a post-risk score indicative of a second level of risk assessment, wherein the post-risk score is computed as a total percentage of m-sets having a diversity metric greater than a threshold and the set of risky records being part of the diverse sets, wherein to perform the second level of risk assessment, the one or more hardware processors are configured by the instruction to:

determine, from amongst the plurality of m-sets, a set of m-sets having the diversity metric greater than a predefined threshold value to obtain a plurality of diverse sets; and determine whether the set of risky records belong to the plurality of diverse sets and a total predefined percentage of the sets are diverse.

10. The system of claim 9, wherein the metadata of the plurality of records comprises one or more of datatype of each of the attributes, nature of distributions, skewness, outliers and dispersion of categories involved in each of the attributes.

11. The system of claim 9, wherein the generalization of the attributes of the plurality of records is defined using taxonomy trees depending upon the levels of the taxonomy tree.

12. The system of claim 9, wherein the record score associated with a record is determined using the following equation:

$$\text{Record Score} = \sum_{p_{ij}}^{n} w_{support} * p_{ij} + w_{confidence} * p_{ij}$$

wherein $w_{support}$ denotes a support metric, $w_{confidence}$ denotes a confidence metric and $p_{ij}$ denotes the frequent patterns present in the record with attributes as i→j, i being the antecedent and j being the consequent, and wherein the support metric and the confidence metric are predefined and n being the possible number of combinations of i→j frequent patterns within a record.

13. The system of claim 9, wherein to perform the first level of risk assessment, the one or more hardware processors are configured by the instructions to:

compute, for each of the different values in an attribute, a probability value of risk level of the attributes, wherein one or more attributes associated with probability values below a predefined threshold are regarded as rare attributes; and filter one or more records from amongst the plurality of records as risky records based on the record score and association with the rare attributes.

14. The system of claim 9, wherein to systematically apply the PBKA using the greedy model, the one or more hardware processors are configured by the instructions to:

initialize a set of cluster centers from the set of frequent records;

until a stopping criteria is met, perform a plurality of iteration comprising:

select a record randomly from amongst the set of remaining records and the set of risky records, wherein during the plurality of iterations, the record is selected from the set of remaining records first followed by selection from the set of set of risky records;

compute, for each record of the plurality of records, a distance metric of each record from set of cluster centers, and adding each record to a cluster from amongst the set of clusters that is associated with a minimum value of the distance metric;

compute a sum of mean square loss for each of the clusters formed and comparing the sum of mean square loss of current iteration with a previous iteration, wherein the mean square loss for the each cluster is computed as sum of squared differences of each point in a cluster with the mean of that cluster followed by updating the cluster centers as the mean of that cluster;

on determination of the sum of the mean square loss for a cluster in the current iteration less than or equal to the mean square loss in the previous iteration, save the cluster associated with the current iteration; and perform, for each cluster of the set of clusters, pattern mapping to form the m-sets in each cluster based on the generalized information loss, wherein for each record, patterns are identified for generalization, said patterns are obtained dynamically by combining different levels of taxonomy trees for the selected set of quasi-identifiers and for each identified pattern generalized information loss is obtained, and wherein a pattern resulting in a minimal loss is mapped to the record, and wherein the stopping criteria comprises one of an exhaustion of the plurality of iterations and determination that the mean square error loss is constant in a predefined set of iterations from amongst the plurality of iterations.

15. The system of claim 14, wherein the distance metric comprises a penalized Weighted Hierarchical Distance (WHD), wherein the penalized WHD is expressed using the following equation:

Penalized WHD(Distance r1,r2)=WHD+Penalty where, when a cell is generalized from level p to q WHD of generalization is defined as $$WHD(pq) = \frac{\sum_{j=p+1}^{q} w_{j-1,j}}{\sum_{j=2}^{h} w_{j-1,j}}$$

weight of the generalization from level j−1 to j is w(j−1), j, where 2≤j≤h, and wherein penalty=0, if the records $r_1$, $r_2$ belong to different class (i) i.e. the corresponding sensitive attribute value, and penalty=Yi, if records $r_1$, $r_2$ belong to same class (i), and Yi=Total instances of class (i)/Total instances.

16. The system of claim 9, wherein the diversity score for a m-set of the plurality of m-sets is computed using the following equation:

$$\text{Diversity Score } (m) = \frac{\left(\sum_{i=0}^{n} \text{proportion}_{S_i} * x_{S_i,m}\right) * y_m}{z_m}$$

wherein, proportions; is defined as the ratio of total number of records with sensitive values in the dataset to total number of records in the dataset, $x_{si,m}$ represents the total number of records in the $m^{th}$-set having $S_i$ as the sensitive value, $z_m$ represents the size of set and $y_m$ represents the total number of unique sensitive values in the $m^{th}$-set.

17. One or more non-transitory machine readable information storage mediums comprising one or more instructions which when executed by one or more hardware processors cause:

obtaining a dataset comprising a plurality of records for anonymization, the plurality of records comprising a plurality of attributes, via one or more hardware processors;

identifying a first set of properties and a second set of properties of the plurality of records, via the one or more hardware processors, wherein the first set of properties is associated with metadata of the plurality of records, and the second set of properties defines generalization of the attributes of the plurality of records;

identifying, via the one or more hardware processors, one or more sensitive attributes, personal identifiable information (PII) and quasi-identifiers set associated with the plurality of attributes;

identifying, using one or more association rule mining techniques, a plurality of patterns in a subset of the dataset associated with the quasi-identifier set, via the one or more hardware processors, each of the plurality of patterns comprises a combination of attribute values associated with the plurality of attributes, the plurality of patterns identified based on a frequency of pattern occurrence in the plurality of records;

computing, via the one or more hardware processors, a record score associated with each record of the plurality of records based on a pattern associated with the record, wherein the record score associated with the record is indicative of risk-level associated with the record, and wherein the record score associated with the record is determined based on a support metric and a confidence metric associated with the record;

performing, based on the record score and an attribute proportion value associated with the plurality of attributes of the record, via the one or more hardware processors, a first level of risk assessment for the plurality of records to identify a set of risky records from amongst the plurality of records, the attribute proportion value associated with an attribute is indicative of proportion of the attribute in plurality of records;

classifying, via the one or more hardware processors, the set of risky records into a set of levels indicative of a seventy of risk based on the one or more sensitive attributes associated with each of the set of risky records;

systematically applying a pattern-based K-Anonymization (PBKA) to the set of risky records and a set of remaining records from amongst the plurality of records using a greedy model, via the one or more hardware processors, wherein applying the PBKA comprises:

clustering the set of risky records and the set of remaining records to obtain a plurality of clusters, and for each cluster of the plurality of clusters, forming a plurality of m-sets by mapping at least k records from amongst the plurality of records to a pattern from amongst the plurality of patterns based on the generalized information loss incurred;

computing, via the one or more hardware processors, a diversity metric for each m-set of the plurality of the m-sets, wherein the diversity metric is indicative of a distribution of the one or more sensitive attributes in the m-sets, and wherein the diversity metric of an m-set from amongst the plurality of m-sets is proportional to a distribution of unique sensitive attributes from amongst the one or more sensitive attributes in the dataset and a number of unique values in the m-set, and inversely proportional to size of the m-set;

computing, via the one or more hardware processors, a post-risk score indicative of a second level of risk assessment, wherein the post-risk score is computed as a total percentage of m-sets having a diversity metric greater than a threshold and the set of risky records being part of the diverse sets, wherein performing the second level of risk assessment comprises:

determining, from amongst the plurality of m-sets, a set of m-sets having the diversity metric greater than a predefined threshold value to obtain a plurality of diverse sets, and determining whether the set of risky records belong to the plurality of diverse sets and a total predefined percentage of the sets are diverse.

\* \* \* \* \*